(12) United States Patent
Oshima (10) Patent No.: US 10,746,988 B2
(45) Date of Patent: Aug. 18, 2020

(54) PROJECTION DISPLAY DEVICE, PROJECTION CONTROL METHOD, AND NON-TRANSITORY COMPUTER READABLE MEDIUM STORING PROJECTION CONTROL PROGRAM

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 16/118,470

(22) Filed: Aug. 31, 2018

(65) Prior Publication Data

US 2018/0373033 A1 Dec. 27, 2018

Related U.S. Application Data

(63) Continuation of application No. PCT/JP2017/002125, filed on Jan. 23, 2017.

(30) Foreign Application Priority Data

Mar. 2, 2016 (JP) .................................. 2016-040422

(51) Int. Cl.
*G02B 27/14* (2006.01)
*G02B 27/01* (2006.01)
(Continued)

(52) U.S. Cl.
CPC .......... *G02B 27/0101* (2013.01); *B60K 35/00* (2013.01); *G02B 5/0205* (2013.01);
(Continued)

(58) Field of Classification Search
CPC .............. G02B 27/0101; G02B 5/0205; G02B 27/0093; G02B 27/0983;
(Continued)

(56) References Cited

U.S. PATENT DOCUMENTS 5,734,357 A * 3/1998 Matsumoto ............ G02B 27/01
345/7
2009/0303158 A1 12/2009 Takahashi et al.
2016/0320624 A1 11/2016 Yamaoka

FOREIGN PATENT DOCUMENTS

CN 103728727 4/2014
JP H0438829 4/1992
(Continued)

OTHER PUBLICATIONS

"Office Action of China Counterpart Application", dated Jan. 11, 2019, with English translation thereof, p. 1-p. 9.
(Continued)

*Primary Examiner* — William Choi
(74) *Attorney, Agent, or Firm* — JCIPRNET (57) ABSTRACT

A projection display device includes: a projection display unit that performs, in accordance with input image data, spatial modulation on light emitted by a light source, and projects image light obtained through the spatial modulation onto a projection surface of a vehicle to display an image that is based on the image data; an eye position detection unit that detects, in accordance with captured image data obtained by capturing an image of a driver of the vehicle by an imaging unit, positions of two eyes of the driver in the captured image data; and a control unit as defined herein.

21 Claims, 7 Drawing Sheets

(51) Int. Cl.
  *B60K 35/00* (2006.01)
  *H04N 9/31* (2006.01)
  *G02B 27/00* (2006.01)
  *G03B 17/54* (2006.01)
  *G02B 5/02* (2006.01)
  *G02B 27/09* (2006.01)
  *G03B 21/00* (2006.01)
  *G06F 3/01* (2006.01)

(52) U.S. Cl.
  CPC ..... *G02B 27/0093* (2013.01); *G02B 27/0983* (2013.01); *G03B 17/54* (2013.01); *G03B 21/005* (2013.01); *G06F 3/013* (2013.01); *H04N 9/317* (2013.01); *H04N 9/3108* (2013.01); *H04N 9/3194* (2013.01); *B60K 2370/149* (2019.05); *B60K 2370/1529* (2019.05); *B60K 2370/334* (2019.05); *G02B 2027/0181* (2013.01)

(58) Field of Classification Search
  CPC ............ G02B 2027/0181; B60K 35/00; B60K 2370/1529; B60K 2370/149; B60K 2370/334; G03B 17/54; G03B 21/005; H04N 9/3108; H04N 9/317; H04N 9/3194; G06F 3/013
  USPC .......................................... 359/630; 345/7, 9
  See application file for complete search history.

(56) References Cited

FOREIGN PATENT DOCUMENTS

| | | |
|---|---|---|
| JP | H06247184 | 9/1994 |
| JP | H10100739 | 4/1998 |
| JP | 2009292409 | 12/2009 |
| JP | 2011121402 | 6/2011 |
| JP | 2014225017 | 12/2014 |
| JP | 2015134521 | 7/2015 |
| JP | 2015225119 | 12/2015 |
| WO | 2011070738 | 6/2011 |
| WO | 2012039021 | 3/2012 |

OTHER PUBLICATIONS

"Written Opinion of the International Searching Authority (Form PCT/ISA/237) of PCT/JP2017/002125," dated Feb. 28, 2017, with English translation thereof, pp. 1-7.

"International Search Report (Form PCT/ISA/210) of PCT/JP2017/002125," dated Feb. 28, 2017, with English translation thereof, pp. 1-5.

* cited by examiner

PROJECTION DISPLAY DEVICE, PROJECTION CONTROL METHOD, AND NON-TRANSITORY COMPUTER READABLE MEDIUM STORING PROJECTION CONTROL PROGRAM

CROSS REFERENCE TO RELATED APPLICATION

This is a continuation of International Application No. PCT/JP2017/002125 filed on Jan. 23, 2017, and claims priority from Japanese Patent Application No. 2016-040422 filed on Mar. 2, 2016, the entire disclosures of which are incorporated herein by reference.

BACKGROUND OF THE INVENTION

1. Field of the Invention

The present invention relates to a projection display device, a projection control method, and a computer readable medium storing a projection control program.

2. Description of the Related Art

A head-up display (HUD) for a vehicle has been known. In the HUD, a combiner disposed on a windshield or near a position before the windshield of a vehicle, such as an automobile, a train, a ship, a heavy machine, a construction machine, an aircraft, or an agricultural machine, is used as a screen and light is projected onto the screen to display an image (see, for example, WO2012/039021A and JP2014-225017A). The HUD enables a driver to visually recognize an image that is based on light projected from the HUD as a real image on the screen or as a virtual image in front of the screen.

The HUD described in WO2012/039021A detects the positions of the eyes of a driver by using a camera installed in an automobile and controls the angle of a combiner in accordance with the detected positions of the eyes, thereby preventing a decrease in visibility of a virtual image resulting from a change in the positions of the eyes.

The HUD described in JP2014-225017A detects the positions of the eyes of a driver by using a camera installed in an automobile and changes the projection range of image light in accordance with the detected positions of the eyes, thereby preventing a decrease in visibility of a virtual image resulting from a change in the positions of the eyes.

SUMMARY OF THE INVENTION

Each of the HUDs described in WO2012/039021A and JP2014-225017A controls the projection state of image light in accordance with a change in the positions of the eyes of the driver, thereby enabling the driver to visually recognize a virtual image constantly and stably.

However, in the case of controlling the projection state of image light in accordance with a change in the positions of the eyes of the driver, the visibility of a virtual image may decrease in some situations.

For example, in a situation where image light enters only one of the eyes of the driver or in a situation where image light enters neither of the eyes of the driver, it is considered to be desirable to immediately change the projection position of the image light so that the image light enters both the eyes of the driver. However, if the projection position of the image light is changed while the vehicle is running at high speed, an instantaneous change in a virtual image may be recognized as flicker by the driver. Thus, there is a possibility that the attention to a region ahead decreases during high-speed running.

In addition, in a situation where a vehicle is reversing, such as in a parking operation, the positions of the eyes of the driver frequently change. If the projection state of image light is frequently changed in such a situation, a change in a virtual image is annoying for the driver.

The present invention has been made in view of the above-described circumstances and an object of the present invention is to provide a projection display device, a projection control method, and a projection control program that are able to present necessary information to a driver of a vehicle when necessary without imposing any burden on the driver.

A projection display device according to the present invention includes a projection display unit that performs, in accordance with input image data, spatial modulation on light emitted by a light source, and projects image light obtained through the spatial modulation onto a projection surface of a vehicle to display an image that is based on the image data; an eye position detection unit that detects, in accordance with captured image data obtained by capturing an image of a driver of the vehicle by an imaging unit, positions of two eyes of the driver in the captured image data; and a control unit that performs, in a state where at least one of the two eyes is outside a range of the captured image data in which the image that is based on the image data is visually recognizable by the driver, tracking control of controlling a projection angle of the image light on the projection surface to cause the positions of the two eyes to be within the range. The control unit determines, in accordance with the number of eyes outside the range and a running state of the vehicle, whether or not to perform the tracking control.

A projection control method according to the present invention is a projection control method for performing, in accordance with input image data, spatial modulation on light emitted by a light source, and projecting image light obtained through the spatial modulation onto a projection surface of a vehicle to display an image that is based on the image data. The projection control method includes an eye position detection step of detecting, in accordance with captured image data obtained by capturing an image of a driver of the vehicle by an imaging unit, positions of two eyes of the driver in the captured image data; and a control step of performing, in a state where at least one of the two eyes is outside a range of the captured image data in which the image that is based on the image data is visually recognizable by the driver, tracking control of controlling a projection angle of the image light on the projection surface to cause the positions of the two eyes to be within the range. In the control step, whether or not to perform the tracking control is determined in accordance with the number of eyes outside the range and a running state of the vehicle.

A projection control program according to the present invention is a projection control program for performing, in accordance with input image data, spatial modulation on light emitted by a light source, and projecting image light obtained through the spatial modulation onto a projection surface of a vehicle to display an image that is based on the image data. The projection control program causes a computer to execute an eye position detection step of detecting, in accordance with captured image data obtained by capturing an image of a driver of the vehicle by an imaging unit, positions of two eyes of the driver in the captured image data; and a control step of performing, in a state where at least one of the two eyes is outside a range of the captured image data in which the image that is based on the image data is visually recognizable by the driver, tracking control of controlling a projection angle of the image light on the projection surface to cause the positions of the two eyes to be within the range. In the control step, whether or not to perform the tracking control is determined in accordance with the number of eyes outside the range and a running state of the vehicle.

According to the present invention, a projection display device, a projection control method, and a projection control program that are able to present necessary information to a driver of a vehicle when necessary without imposing any burden on the driver can be provided.

REFERENCE SIGNS LIST 100, 100A projection display system
10, 10A HUD
1 automobile
2 front windshield
3 dashboard
4 image light generation unit
5 concave mirror
6, 6A system control unit
7 wavelength selection film
8 transparent plate
9 combiner
11, 13 rotation mechanism
12 imaging unit
40 light source unit
40A light source control unit
41r R light source
41g G light source
41b B light source
42r, 42g, 42b collimator lens
43 dichroic prism
44 light modulation element
45 driving unit
46 diffusion member
61 eye position detection unit
62 tracking control unit

DESCRIPTION OF THE PREFERRED EMBODIMENTS

Hereinafter, an embodiment of the present invention will be described with reference to the drawings.

Figure 1:
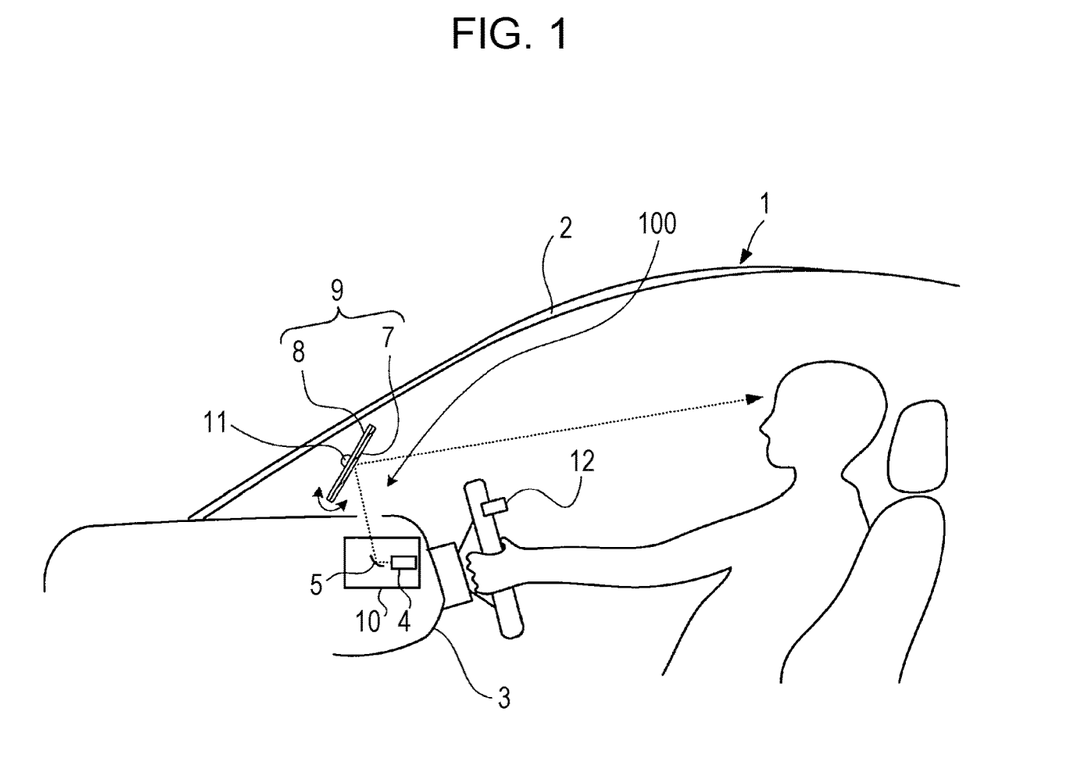
FIG. 1 is a diagram illustrating the schematic configuration of a projection display system 100 including a head-up display (HUD) 10 serving as a projection display device according to an embodiment of the present invention.
Figure 2:
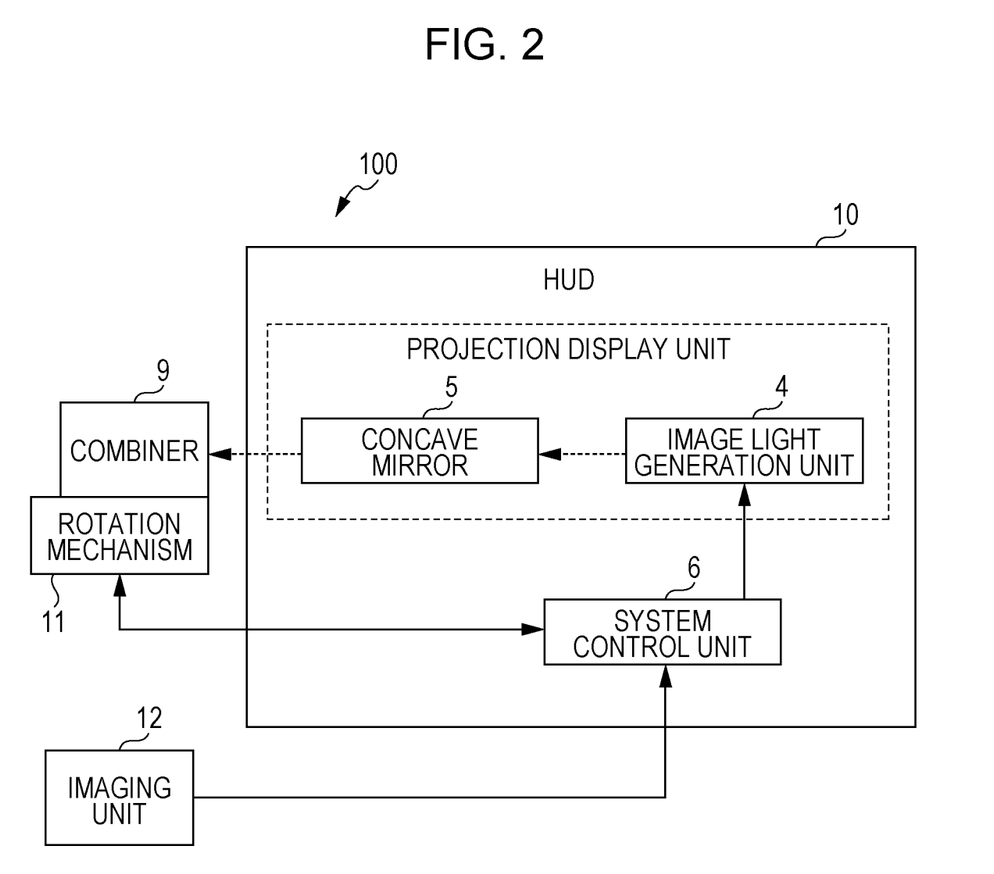
FIG. 2 is a schematic diagram illustrating the configuration of the projection display system 100 illustrated in FIG. 1.

FIG. 1 is a diagram illustrating the schematic configuration of a projection display system 100 including a head-up display (HUD) 10 serving as a projection display device according to an embodiment of the present invention. FIG. 2 is a schematic diagram illustrating the configuration of the projection display system 100 illustrated in FIG. 1.

The projection display system 100 is mounted in an automobile 1 and includes a combiner 9 disposed before a front windshield 2 on the driver side, the HUD 10, a rotation mechanism 11 for rotating the combiner 9, and an imaging unit 12.

In the automobile 1, two drive modes are settable. The two drive modes are a forward mode in which the automobile 1 moves toward a region in front of the front windshield 2 (in a direction of the hood) viewed from the driver, and a reverse mode in which the automobile 1 moves in a direction away from the region in front of the front windshield 2. The drive mode can be set by the driver by operating a shift lever or the like (not illustrated) of the automobile 1.

The projection display system 100 illustrated in FIG. 1 may be used by being mounted in a vehicle, such as a train, a heavy machine, a construction machine, an aircraft, a ship, or an agricultural machine, as well as an automobile.

The HUD 10 uses the combiner 9 as a projection surface and enables a driver of the automobile 1 to visually recognize a virtual image or real image by using image light projected onto the combiner 9.

In the example illustrated in FIG. 1, the HUD 10 is built in a dashboard 3 of the automobile 1. The dashboard 3 is a member that contains, in its inside, built-in components including gauges for presenting information necessary for driving, such as a speedometer, a tachometer, a fuel gauge, a water temperature gauge, an odometer, or the like of the automobile 1.

The HUD 10 may be installed near the ceiling above the driver's seat of the automobile 1. In this case, the combiner 9 and the rotation mechanism 11 are installed near the ceiling above the driver's seat.

The combiner 9 includes a transparent plate 8 and a wavelength selection film 7 formed on a surface of the transparent plate 8.

The transparent plate 8 is a plate-like member that allows visible light to pass therethrough.

The wavelength selection film 7 is a member that allows visible light to pass therethrough and has a reflectance that is higher for light in at least one wavelength range than for light in a wavelength range outside the wavelength range. In FIG. 1, the positions of the wavelength selection film 7 and the transparent plate 8 may be inverted.

As described in WO2015/50202A, a member that has a visible light transmitting property and has a center wavelength of a reflection wavelength range in each of a plurality of wavelength ranges may be used as the wavelength selection film 7.

The rotation mechanism 11 is a projection angle control mechanism for controlling the projection angle (incidence angle) of image light projected onto the combiner 9 from the HUD 10.

Specifically, the rotation mechanism 11 is a mechanism for rotating the combiner 9 around an axis that extends in a direction of connecting the driver's seat and the passenger seat of the automobile 1. When the combiner 9 rotates around the axis, the projection angle of image light on a surface on which the image light is projected (projection surface) of the combiner 9 is changed. The change in the projection angle of the image light causes a change in the position in a gravitational direction of a virtual image or real image visually recognized by the driver of the automobile 1.

The rotation mechanism 11 includes an actuator (not illustrated), such as a stepper motor, and controls the rotation angle of the combiner 9 by using a system control unit 6, which will be described below.

The HUD 10 includes an image light generation unit 4, a concave mirror 5, and the system control unit 6. The image light generation unit 4 includes a light source and a light modulation element that performs, in accordance with image data, spatial modulation on light emitted by the light source. The concave mirror 5 serves as an enlarging and projecting member that enlarges image light obtained through the spatial modulation performed by the light modulation element of the image light generation unit 4 and that projects the image light onto the combiner 9. The system control unit 6 integrally controls the entire HUD 10.

The image light generation unit 4 and the concave mirror 5 constitute a projection display unit that projects, onto the combiner 9 of the automobile 1, image light obtained through spatial modulation performed in accordance with image data and that displays an image that is based on the image data.

The system control unit 6 is mainly constituted by a processor and includes a read only memory (ROM) storing a program or the like to be executed by the processor, a random access memory (RAM) serving as a work memory, and so forth. The program includes a projection control program.

The imaging unit 12 captures an image of an imaging range including an eye box, which is a range of the positions of the eyes of the driver where an image that is based on image light projected from the HUD 10 onto the combiner 9 can be visually recognized by the driver of the automobile 1. When one of the two eyes of the driver is within the eye box, the image that is based on image light can be visually recognized by the eye.

In the projection display system 100, the combiner 9 is rotatable and thus an eye box is set for each rotation position of the combiner 9. That is, the position of the eye box is changed in accordance with rotation of the combiner 9. The imaging unit 12 captures an image of a range including all the eye boxes that are set. The imaging unit 12 is installed near the steering wheel of the automobile 1 in the example in FIG. 1, but the arrangement position is not limited thereto.

Figure 3:
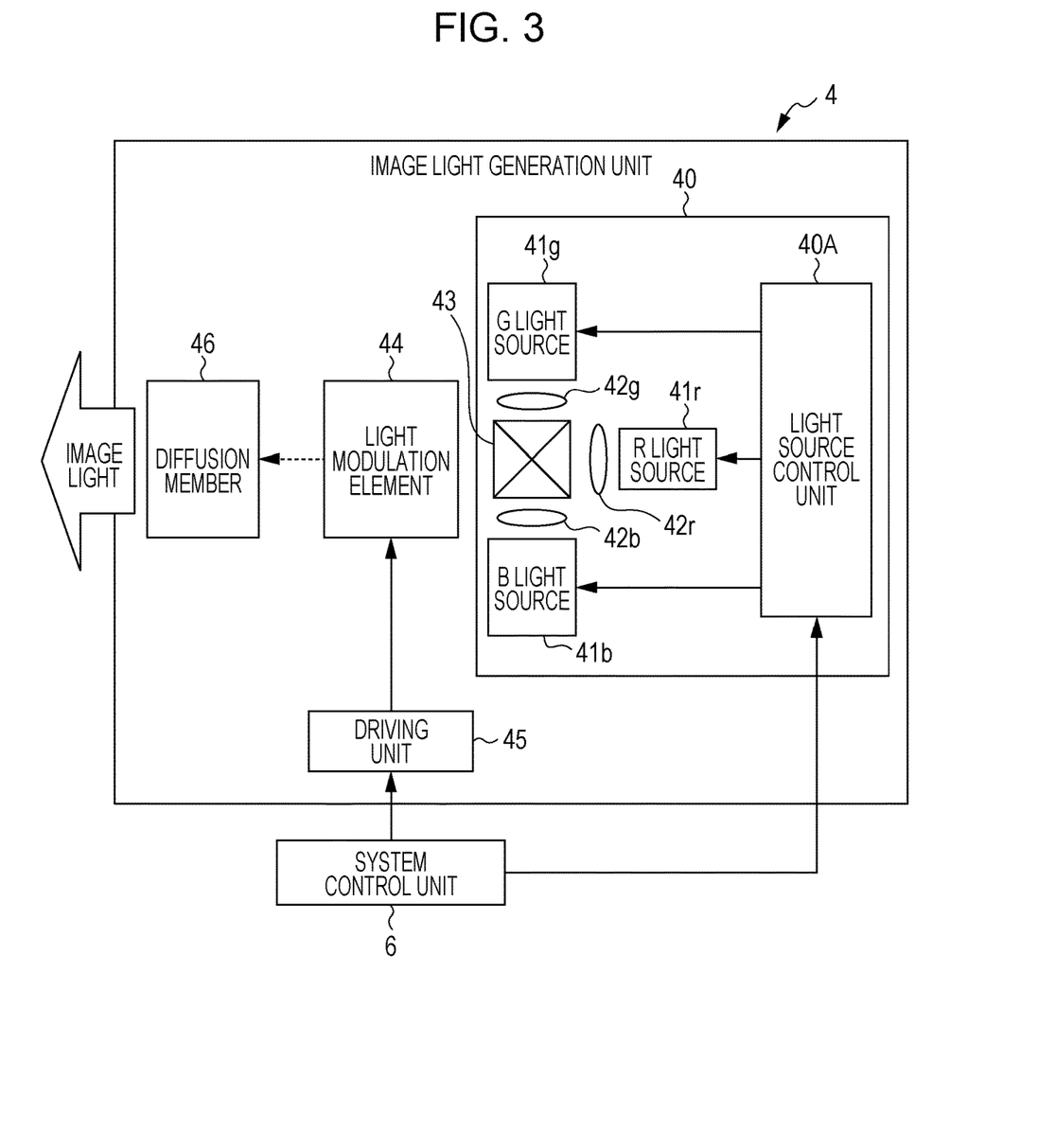
FIG. 3 is a diagram illustrating an example of the internal configuration of an image light generation unit 4 illustrated in FIG. 2.

FIG. 3 is a diagram illustrating an example of the internal configuration of the image light generation unit 4 illustrated in FIG. 2.

The image light generation unit 4 includes a light source unit 40, a light modulation element 44, a driving unit 45 that drives the light modulation element 44, and a diffusion member 46.

The light source unit 40 includes a light source control unit 40A, an R light source 41r serving as a red light source that emits red light, a G light source 41g serving as a green light source that emits green light, a B light source 41b serving as a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43. The R light source 41r, the G light source 41g, and the B light source 41b constitute a light source of the HUD 10.

The dichroic prism 43 is an optical member for guiding rays of light emitted by the R light source 41r, the G light source 41g, and the B light source 41b to an identical light path. The dichroic prism 43 allows red light collimated by the collimator lens 42r to pass therethrough and emits the red light to the light modulation element 44. In addition, the dichroic prism 43 allows green light collimated by the collimator lens 42g to be reflected thereby and emits the green light to the light modulation element 44. Furthermore, the dichroic prism 43 allows blue light collimated by the collimator lens 42b to be reflected thereby and emits the blue light to the light modulation element 44. The optical member having such a function is not limited to the dichroic prism. For example, a cross dichroic mirror may be used.

A light emitting element, such as a laser or a light emitting diode (LED), is used as each of the R light source 41r, the G light source 41g, and the B light source 41b. The light source of the HUD 10 is not limited to the three light sources, that is, the R light source 41r, the G light source 41g, and the B light source 41b, and may be constituted by one light source, or two light sources or four or more light sources each of which emits light in one of different wavelength ranges.

The light source control unit 40A controls each of the R light source 41r, the G light source 41g, and the B light source 41b, and performs control to cause light to be emitted by each of the R light source 41r, the G light source 41g, and the B light source 41b.

The light modulation element 44 spatially modulates, in accordance with image data received from the system control unit 6, the rays of light emitted by the R light source 41r, the G light source 41g, and the B light source 41b and emitted from the dichroic prism 43.

As the light modulation element 44, for example, liquid crystal on silicon (LCOS), a digital micromirror device (DMD), a micro electro mechanical systems (MEMS) element, a liquid crystal display element, or the like may be used.

The driving unit 45 drives the light modulation element 44 in accordance with image data received from the system control unit 6 and causes image light corresponding to the image data (red image light, blue image light, and green image light) to be emitted from the light modulation element 44 to the diffusion member 46.

The diffusion member 46 is a member that diffuses image light obtained through spatial modulation performed by the light modulation element 44, thereby making a plane light source. As the diffusion member 46, a micromirror array having a fine structure on its surface, a diffusion mirror, a reflection holographic diffuser, or the like is used.

The diffusion member 46 and the concave mirror 5 are optically designed so that an image based on image light projected onto the combiner 9 can be visually recognized by the driver as a virtual image at a position in front of the front windshield 2. The diffusion member 46 and the concave mirror 5 may be optically designed so that the image based on the image light can be visually recognized by the driver as a real image on the combiner 9.

The system control unit 6 of the HUD 10 controls the light source control unit 40A and the driving unit 45 and causes image light that is based on image data to be emitted from the image light generation unit 4 to the concave mirror 5.

Figure 4:
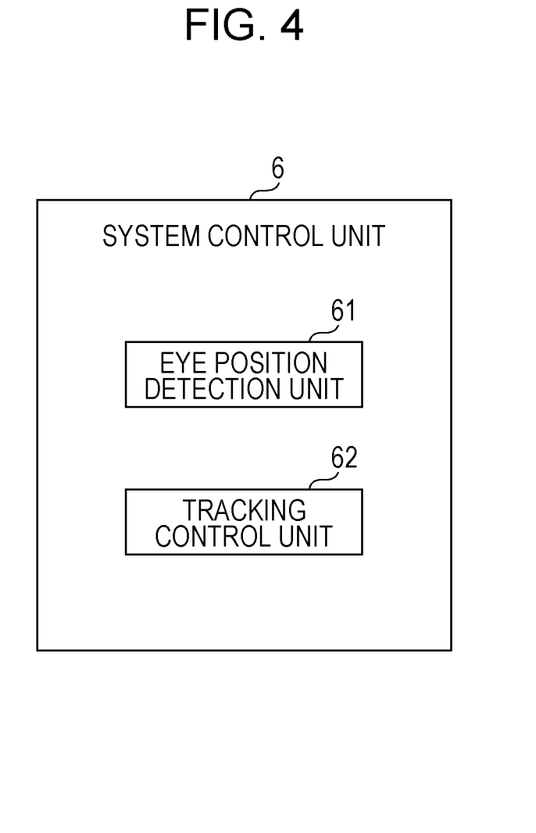
FIG. 4 is a functional block diagram of a system control unit 6 illustrated in FIG. 3.

FIG. 4 is a functional block diagram of the system control unit 6 illustrated in FIG. 3.

The system control unit 6 includes an eye position detection unit 61 and a tracking control unit 62. The eye position detection unit 61 and the tracking control unit 62 are implemented by execution of a program stored in the ROM by the processor. The program includes a projection control program. The tracking control unit 62 constitutes a control unit.

The eye position detection unit 61 acquires, through wired or wireless communication, captured image data obtained by capturing an image of the face of the driver by the imaging unit 12. Subsequently, the eye position detection unit 61 detects the positions of the two eyes of the driver in the captured image data in accordance with the acquired captured image data.

The tracking control unit 62 performs, in a state where at least one of the two eyes detected by the eye position detection unit 61 is outside the eye box in the captured image data, tracking control of moving the eye box by rotating the combiner 9 by using the rotation mechanism 11 to cause the positions of the two eyes to be within the eye box.

The tracking control unit 62 determines, by using the positions of the two eyes of the driver detected by the eye position detection unit 61 and information about the eye box, the number of eyes of the driver existing outside the eye box in the captured image data, and determines, in accordance with the determined number of eyes and the running state of the automobile 1, whether or not to perform tracking control.

Figure 5:
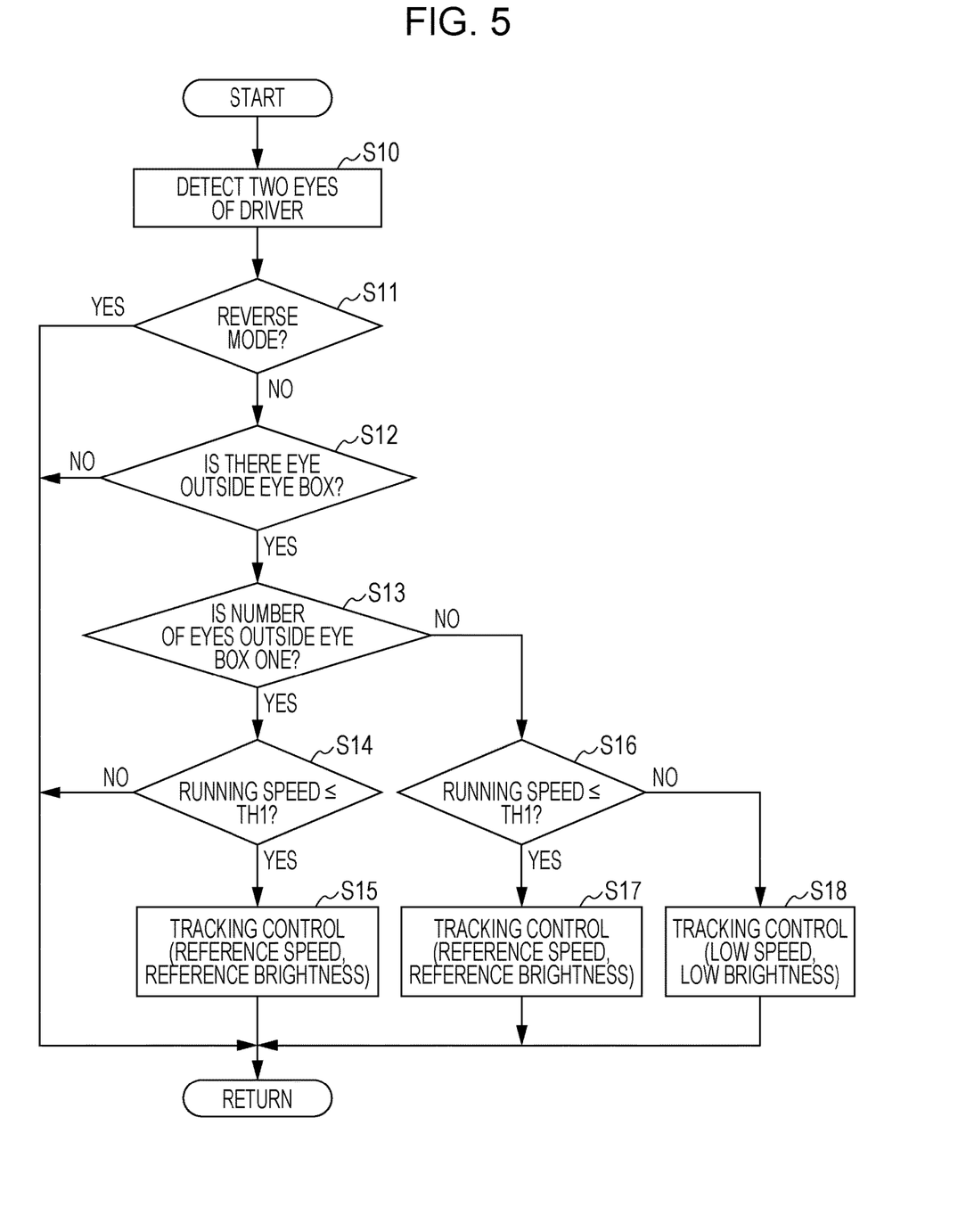
FIG. 5 is a flowchart for describing an operation of the projection display system 100 illustrated in FIG. 1.

FIG. 5 is a flowchart for describing an operation of the projection display system 100 illustrated in FIG. 1.

After the automobile 1 is activated through an operation of starting an engine of the automobile 1 (a motor in the case of an electric car), an operation of starting an electrical system (an air conditioner, lights, and so forth) driven by a battery of the automobile 1, or the like, the flow illustrated in FIG. 5 is started. The flow illustrated in FIG. 5 is repeatedly performed until the automobile 1 stops.

First, the eye position detection unit 61 acquires captured image data captured by the imaging unit 12 and detects the two eyes of the driver from the acquired captured image data (step S10).

Subsequently, the tracking control unit 62 acquires information about the drive mode of the automobile 1 from the system control unit that integrally controls the entire automobile 1 and determines which of the reverse mode and the forward mode is set as the drive mode (step S11).

If the drive mode is the reverse mode (YES in step S11), the tracking control unit 62 determines not to perform tracking control and the process returns to step S10.

If the drive mode is the forward mode (NO in step S11), the tracking control unit 62 determines, in accordance with the positions of the two eyes detected in step S10 and coordinate information of the eye box corresponding to the rotation position of the combiner 9 at the current time point, whether or not one of the two eyes of the driver is outside the eye box (step S12).

If both the eyes of the driver is within the eye box (NO in step S12), the tracking control unit 62 determines not to perform tracking control and the process returns to step S10.

If one of the two eyes of the driver is outside the eye box (YES in step S12), the tracking control unit 62 determines whether or not the number of eyes outside the eye box is one (step S13).

If the number of eyes outside the eye box is one (YES in step S13), the tracking control unit 62 acquires information about the running speed of the automobile 1 from the system control unit that integrally controls the entire automobile 1 and determines whether or not the running speed of the automobile 1 is lower than or equal to a threshold value TH1 (step S14).

If the running speed of the automobile 1 exceeds the threshold value TH1 (NO in step S14), the tracking control unit 62 determines not to perform tracking control and the process returns to step S10.

If the running speed of the automobile 1 is lower than or equal to the threshold value TH1 (YES in step S14), the tracking control unit 62 performs tracking control of rotating the combiner 9 to cause the two eyes of the driver detected by the eye position detection unit 61 to be within the eye box corresponding to the rotation position of the combiner 9 that has been rotated (step S15). After step S15, the process returns to step S10.

In the tracking control in step S15, the tracking control unit 62 controls the rotation speed of the combiner 9 to a reference speed. In addition, in the tracking control in step S15, the tracking control unit 62 controls the brightness of image light to a reference brightness. The reference brightness has a value identical to the value of the brightness of image light immediately before the rotation of the combiner 9 is started.

If the number of eyes outside the eye box is two (NO in step S13), the tracking control unit 62 acquires information about the running speed of the automobile 1 from the system control unit that integrally controls the entire automobile 1 and determines whether or not the running speed of the automobile 1 is lower than or equal to the threshold value TH1 (step S16).

If the running speed of the automobile 1 is lower than or equal to the threshold value TH1 (YES in step S16), the tracking control unit 62 performs tracking control of rotating the combiner 9 to cause the two eyes of the driver detected by the eye position detection unit 61 to be within the eye box corresponding to the rotation position of the combiner 9 that has been rotated (step S17). After step S17, the process returns to step S10.

In the tracking control in step S17, the tracking control unit 62 controls the rotation speed of the combiner 9 to the reference speed. In addition, in the tracking control in step S17, the tracking control unit 62 controls the brightness of image light to the reference brightness.

If the running speed of the automobile 1 exceeds the threshold value TH1 (NO in step S16), the tracking control unit 62 performs tracking control of rotating the combiner 9 to cause the two eyes of the driver detected by the eye position detection unit 61 to be within the eye box corresponding to the rotation position of the combiner 9 that has been rotated (step S18). After step S18, the process returns to step S10.

In the tracking control in step S18, the tracking control unit 62 controls the rotation speed of the combiner 9 to a speed lower than the reference speed. While the combiner 9 is being rotated, the tracking control unit 62 controls the brightness of image light to a brightness lower than the reference brightness.

A method for controlling the brightness of image light may be, for example, a method for controlling the amount of light emitted by each light source of the light source unit 40 or a method for controlling the brightness of image data to be input to the driving unit 45.

After the rotation of the combiner 9 is completed, the tracking control unit 62 sets the brightness of image light to the reference brightness. After the rotation of the combiner 9 is completed, the tracking control unit 62 may gradually increase the brightness of the image light so that the brightness eventually reaches the reference brightness.

In step S18, the rotation speed of the combiner 9 and the brightness of the image light may be decreased as the running speed of the automobile 1 increases. The threshold value TH1 of the running speed used in step S14 and the threshold value TH1 of the running speed used in step S16 are identical to each other. Alternatively, the threshold value used in step S14 may be different from the threshold value used in step S16.

As described above, according to the HUD 10, if the number of eyes of the driver outside the eye box is one, tracking control is performed when the running speed of the automobile 1 becomes lower than or equal to the threshold value TH1. If the number of eyes of the driver outside the eye box is one, an image based on image light can be observed by the other eye of the driver.

In this way, transition from a state where an image based on image light is being observed by one eye to a state where the image based on the image light is being observed by both eyes is not performed when the running speed is high. Accordingly, concentration of the driver can be maintained during high-speed running, which involves high risk of accident, and safe driving can be assisted. On the other hand, the foregoing transition is performed during low-speed running, which involves low risk of accident, and accordingly fatigue resulting from visual recognition of an image with only one eye can be reduced.

In addition, according to the HUD 10, if the number of eyes of the driver outside the eye box is two, tracking control is performed regardless of the running speed of the automobile 1. If the number of eyes of the driver outside the eye box is two, the driver is unable to observe an image that is based on image light. In this case, tracking control is performed and accordingly necessary information can be provided to the driver.

If the number of eyes of the driver outside the eye box is two, the rotation speed of the combiner 9 decreases and the brightness of image light decreases as the running speed of the automobile 1 increases, and thus a change in the image observed by the driver can be made gradual. As a result, information can be provided without interfering with concentration during high-speed running.

In addition, according to the HUD 10, tracking control is not performed while the automobile 1 is in the reverse mode. Thus, frequent changes in an image based on image light can be prevented in a situation where the movement of the line of sight of the driver is large, for example, during a parking operation. As a result, inconvenience caused by frequent changes in the image can be eliminated.

In the tracking control in step S18, the tracking control unit 62 may control the brightness of image light to a brightness lower than the reference brightness and may control the rotation speed of the combiner 9 to the reference speed. In addition, in the tracking control in step S18, the tracking control unit 62 may control the rotation speed of the combiner 9 to a speed lower than the reference speed and may control the brightness of image light to the reference brightness.

Figure 6:
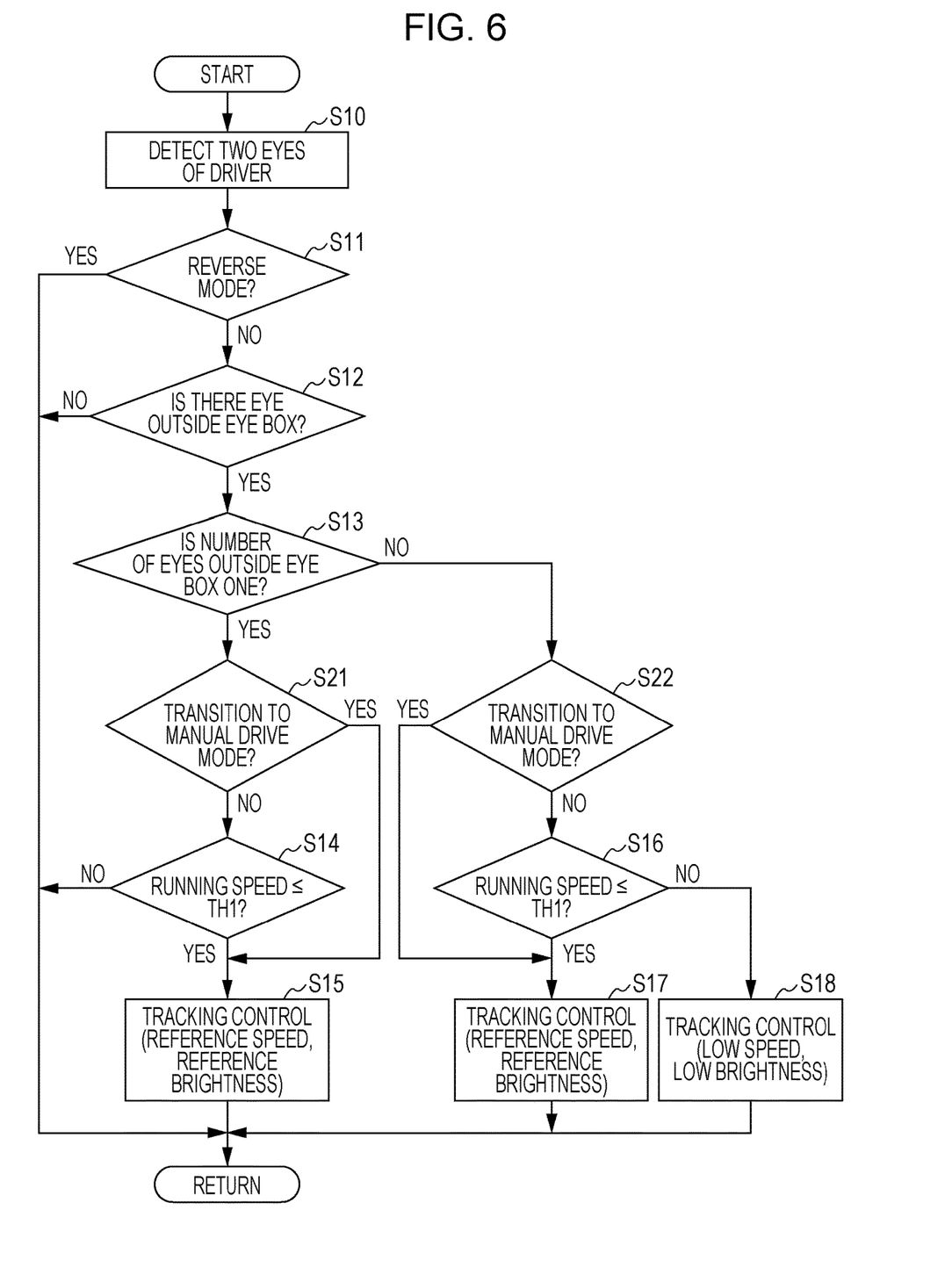
FIG. 6 is a flowchart for describing a modification example of the operation of the projection display system 100 illustrated in FIG. 1.

FIG. 6 is a flowchart for describing a modification example of the operation of the projection display system 100 illustrated in FIG. 1. The flowchart illustrated in FIG. 6 is identical to that in FIG. 5 except that steps S21 and S22 are added. Thus, the steps identical to those in FIG. 5 are denoted by identical reference numerals and the description thereof will not be given.

This modification example is based on the assumption that the drive mode of the automobile 1 further includes an auto drive mode and a manual drive mode. The auto drive mode is a mode in which the system control unit of the automobile performs running control regardless of an operation by the driver. The manual drive mode is a mode in which the automobile runs in accordance with an operation of an accelerator, a brake, a steering wheel, and the like by the driver.

In response to an instruction to switch from the auto drive mode to the manual drive mode, the automobile 1 performs switching to the manual drive mode after a predetermined transition period elapses from when the instruction is given.

In this modification example, if an affirmative determination is made in step S13, the tracking control unit 62 determines whether or not the automobile 1 is in transition from the auto drive mode to the manual drive mode (step S21).

If the automobile 1 is in transition from the auto drive mode to the manual drive mode (YES in step S21), step S15 is performed. On the other hand, if the automobile 1 is not in transition from the auto drive mode to the manual drive mode (NO in step S21), step S14 is performed.

If a negative determination is made in step S13, the tracking control unit 62 determines whether or not the automobile 1 is in transition from the auto drive mode to the manual drive mode (step S22).

If the automobile 1 is in transition from the auto drive mode to the manual drive mode (YES in step S22), step S17 is performed. On the other hand, if the automobile 1 is not in transition from the auto drive mode to the manual drive mode (NO in step S22), step S16 is performed.

As described above, according to the modification example illustrated in FIG. 6, if the automobile 1 is in transition from the auto drive mode to the manual drive mode, the tracking control in step S15 or S17 is performed regardless of the running speed of the automobile 1. During the transition, tracking control is performed without any condition, and accordingly information for prompting the driver to prepare for manual drive can be provided to the driver by using an image that is based on image light. Accordingly, switching from the auto drive mode to the manual drive mode can be performed safely.

Figure 7:
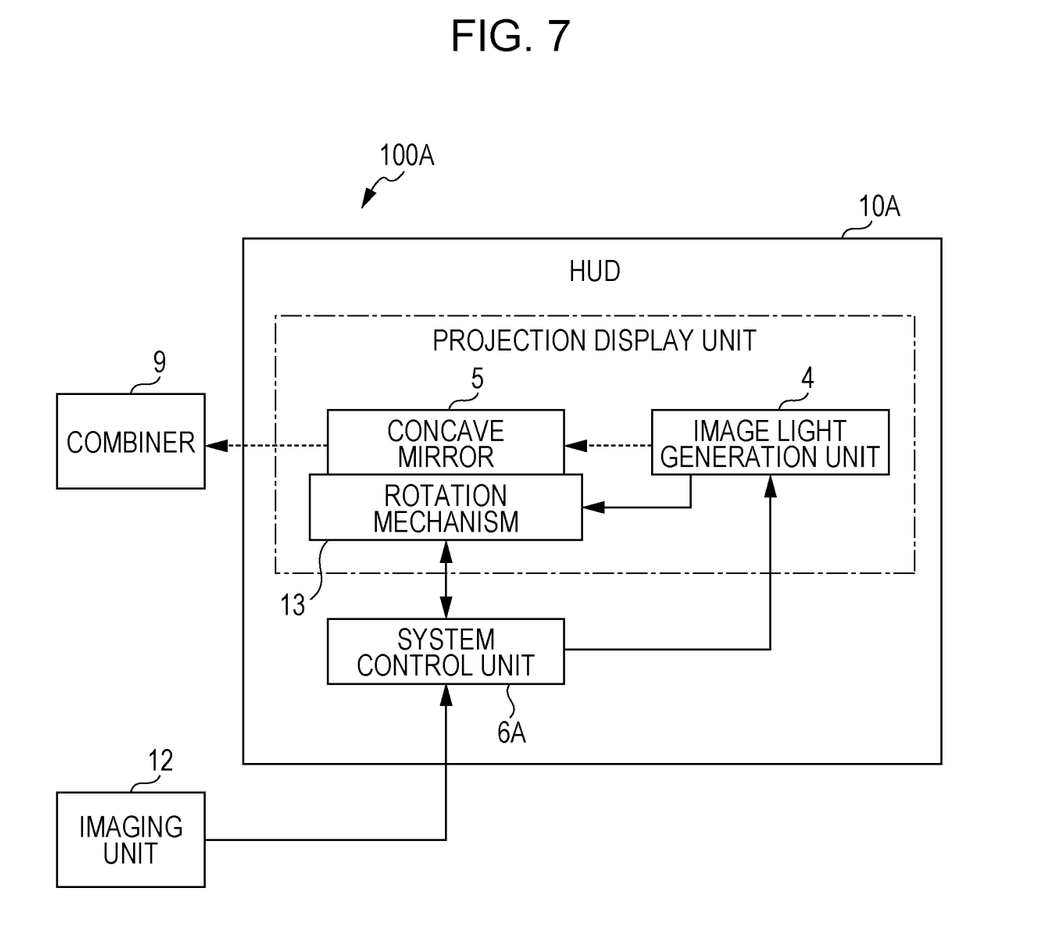
FIG. 7 is a schematic diagram illustrating the configuration of a projection display system 100A, which is a modification example of the projection display system 100 illustrated in FIG. 1.

FIG. 7 is a schematic diagram illustrating the configuration of a projection display system 100A, which is a modification example of the projection display system 100 illustrated in FIG. 1. The projection display system 100A has a configuration identical to that of the projection display system 100 except that the HUD 10 is replaced with a HUD 10A and that the rotation mechanism 11 is not provided. In FIG. 7, the elements identical to those in FIG. 2 are denoted by identical reference numerals and the description thereof will not be given.

The HUD 10A has a configuration identical to that of the HUD 10 illustrated in FIG. 2 except that a rotation mechanism 13 is added and the system control unit 6 is replaced with a system control unit 6A. In the projection display system 100A, the combiner 9 including the transparent plate 8 and the wavelength selection film 7 is not rotatable.

The rotation mechanism 13 is a projection angle control mechanism for controlling the projection angle of image light projected from the HUD 10A onto the combiner 9.

Specifically, the rotation mechanism 13 is a mechanism for rotating the concave mirror 5 so that the projection position on the combiner 9 of the image light projected from the concave mirror 5 is changed in a gravitational direction.

The rotation mechanism 13 is equipped with an actuator (not illustrated) and is driven by the system control unit 6A.

With the concave mirror 5 being rotated by the rotation mechanism 13, the projection angle of image light projected onto the combiner 9 from the concave mirror 5 is changed and the position of the eye box is also changed. In the projection display system 100A, the coordinate information about the eye box corresponding to the rotation position of the concave mirror 5 is stored in the ROM of the system control unit 6A.

The system control unit 6A includes the eye position detection unit 61 and the tracking control unit 62 described above.

The tracking control unit 62 of the system control unit 6A performs, in a state where at least one of the two eyes detected by the eye position detection unit 61 is outside the eye box in the captured image data acquired from the imaging unit 12, tracking control of moving the eye box by rotating the concave mirror 5 by using the rotation mechanism 13 to cause the positions of the two eyes to be within the eye box.

In addition, the tracking control unit 62 of the system control unit 6A determines, by using the positions of the two eyes of the driver detected by the eye position detection unit 61 and the coordinate information about the eye box corresponding to the rotation position of the concave mirror 5, the number of eyes of the driver outside the eye box in the captured image data, and determines, in accordance with the determined number of eyes and the running state of the automobile 1, whether or not to perform tracking control. The method for determining whether or not to perform tracking control is the same as that described with reference to FIG. 5 or 6.

In this way, also in the projection display system capable of moving the eye box by rotating the concave mirror 5, not the combiner 9, necessary information can be provided through control by the system control unit 6A without imposing any burden on the driver.

Alternatively, the projection display system 100A may further have a rotation mechanism for rotating the combiner 9. In this case, the position of the eye box is determined by a combination of the rotation position of the combiner 9 and the rotation position of the concave mirror 5. Thus, the system control unit 6A may use the coordinate information about the eye box corresponding to the combination of the rotation position of the combiner 9 and the rotation position of the concave mirror 5 when making determination in steps S12 and S13 in FIG. 5 or FIG. 6.

In addition, in the projection display system 100A, the combiner 9 may be eliminated, the wavelength selection film 7 may be formed in the range of part of the front windshield 2, and image light may be projected by using the range as a projection surface.

In the above-described projection display system, the rotation of one or both of the combiner 9 and the concave mirror 5 causes the eye box to be moved in a gravitational direction. As a modification example thereof, the rotation of one or both of the combiner 9 and the concave mirror 5 may cause the eye box to be movable in a horizontal direction (the direction in which the driver's seat and the passenger seat are arranged) perpendicular to the gravitational direction. In addition, the rotation of one or both of the combiner 9 and the concave mirror 5 may cause the eye box to be movable in the gravitational direction and the horizontal direction.

As described above, this specification discloses the followings.

A projection display device that is disclosed includes a projection display unit that performs, in accordance with input image data, spatial modulation on light emitted by a light source, and projects image light obtained through the spatial modulation onto a projection surface of a vehicle to display an image that is based on the image data; an eye position detection unit that detects, in accordance with captured image data obtained by capturing an image of a driver of the vehicle by an imaging unit, positions of two eyes of the driver in the captured image data; and a control unit that performs, in a state where at least one of the two eyes is outside a range of the captured image data in which the image is visually recognizable by the driver, tracking control of controlling a projection angle of the image light on the projection surface to cause the positions of the two eyes to be within the range. The control unit determines, in accordance with the number of eyes outside the range and a running state of the vehicle, whether or not to perform the tracking control.

In the projection display device that is disclosed, the running state includes a running speed of the vehicle.

In the projection display device that is disclosed, the control unit performs the tracking control when the running speed of the vehicle becomes lower than or equal to a threshold value if the number of eyes outside the range is one.

In the projection display device that is disclosed, the control unit performs the tracking control regardless of the running speed of the vehicle if the number of eyes outside the range is one and if the vehicle is in a state of transition from an auto drive mode to a manual drive mode.

In the projection display device that is disclosed, the control unit performs the tracking control regardless of the running speed of the vehicle if the number of eyes outside the range is two.

In the projection display device that is disclosed, in the tracking control that is performed if the number of eyes outside the range is two, the control unit decreases, as the running speed of the vehicle increases, at least one of a control speed of the projection angle or brightness of the image light in a period over which the projection angle is controlled.

In the projection display device that is disclosed, the control unit sets, to a predetermined value, the control speed of the projection angle during the tracking control and the brightness of the image light in the period over which the projection angle is controlled, regardless of the running speed of the vehicle if the number of eyes outside the range is two and if the vehicle is in a state of transition from an auto drive mode to a manual drive mode.

In the projection display device that is disclosed, the control unit performs the tracking control regardless of the running speed of the vehicle if the number of eyes outside the range is two, and in the tracking control, the control unit decreases, as the running speed of the vehicle increases, at least one of a control speed of the projection angle or brightness of the image light in a period over which the projection angle is controlled.

In the projection display device that is disclosed, the control unit does not perform the tracking control regardless of the number of eyes outside the range if the vehicle is in a reverse running state.

In the projection display device that is disclosed, the projection display unit displays a virtual image that is based on the image data.

A projection control method that is disclosed is a projection control method for performing, in accordance with input image data, spatial modulation on light emitted by a light source, and projecting image light obtained through the spatial modulation onto a projection surface of a vehicle to display an image that is based on the image data. The projection control method includes an eye position detection step of detecting, in accordance with captured image data obtained by capturing an image of a driver of the vehicle by an imaging unit, positions of two eyes of the driver in the captured image data; and a control step of performing, in a state where at least one of the two eyes is outside a range of the captured image data in which the image is visually recognizable by the driver, tracking control of controlling a projection angle of the image light on the projection surface to cause the positions of the two eyes to be within the range. In the control step, whether or not to perform the tracking control is determined in accordance with the number of eyes outside the range and a running state of the vehicle.

In the projection control method that is disclosed, the running state includes a running speed of the vehicle.

In the projection control method that is disclosed, in the control step, the tracking control is performed when the running speed of the vehicle becomes lower than or equal to a threshold value if the number of eyes outside the range is one.

In the projection control method that is disclosed, in the control step, the tracking control is performed regardless of the running speed of the vehicle if the number of eyes outside the range is one and if the vehicle is in a state of transition from an auto drive mode to a manual drive mode.

In the projection control method that is disclosed, in the control step, the tracking control is performed regardless of the running speed of the vehicle if the number of eyes outside the range is two.

In the projection control method that is disclosed, in the tracking control that is performed if the number of eyes outside the range is two, in the control step, at least one of a control speed of the projection angle or brightness of the image light in a period over which the projection angle is controlled is decreased as the running speed of the vehicle increases.

In the projection control method that is disclosed, in the control step, the control speed of the projection angle during the tracking control and the brightness of the image light in the period over which the projection angle is controlled are set to a predetermined value regardless of the running speed of the vehicle if the number of eyes outside the range is two and if the vehicle is in a state of transition from an auto drive mode to a manual drive mode.

In the projection control method that is disclosed, in the control step, the tracking control is performed regardless of the running speed of the vehicle if the number of eyes outside the range is two, and in the tracking control, at least one of a control speed of the projection angle or brightness of the image light in a period over which the projection angle is controlled is decreased as the running speed of the vehicle increases.

In the projection control method that is disclosed, in the control step, the tracking control is not performed regardless of the number of eyes outside the range if the vehicle is in a reverse running state.

In the projection control method that is disclosed, the image that is based on the image data includes a virtual image.

A projection control program that is disclosed is a projection control program for performing, in accordance with input image data, spatial modulation on light emitted by a light source, and projecting image light obtained through the spatial modulation onto a projection surface of a vehicle to display an image that is based on the image data. The projection control program causes a computer to execute an eye position detection step of detecting, in accordance with captured image data obtained by capturing an image of a driver of the vehicle by an imaging unit, positions of two eyes of the driver in the captured image data; and a control step of performing, in a state where at least one of the two eyes is outside a range of the captured image data in which the image is visually recognizable by the driver, tracking control of controlling a projection angle of the image light on the projection surface to cause the positions of the two eyes to be within the range. In the control step, whether or not to perform the tracking control is determined in accordance with the number of eyes outside the range and a running state of the vehicle.

According to the present invention, a projection display device, a projection control method, and a projection control program that are able to present necessary information to a driver of a vehicle when necessary without imposing any burden on the driver can be provided.

The present invention has been described above by using a specific embodiment. The present invention is not limited to the embodiment and can be variously changed without deviating from the technical spirit of the disclosed invention.

This application is based on Japanese Patent Application No. 2016-040422 filed on Mar. 2, 2016, which is incorporated herein in its entirety.

What is claimed is:

1. A projection display device comprising:
   a projection display unit that performs, in accordance with input image data, spatial modulation on light emitted by a light source, and projects image light obtained through the spatial modulation onto a projection surface of a vehicle to display an image that is based on the image data;
   an eye position detection unit that detects, in accordance with captured image data obtained by capturing an image of a driver of the vehicle by an imaging unit, positions of two eyes of the driver in the captured image data; and
   a control unit that performs, in a state where at least one of the two eyes is outside a range of the captured image data in which the image that is based on the image data is visually recognizable by the driver, tracking control of controlling a projection angle of the image light on the projection surface to cause the positions of the two eyes to be within the range, wherein
   the control unit determines, in accordance with number of eyes outside the range and a running state of the vehicle, whether or not to perform the tracking control.

2. The projection display device according to claim 1, wherein
   the running state comprises a running speed of the vehicle.

3. The projection display device according to claim 2, wherein
   the control unit performs the tracking control when the running speed of the vehicle becomes lower than or equal to a threshold value if the number of eyes outside the range is one.

4. The projection display device according to claim 3, wherein
   the control unit performs the tracking control regardless of the running speed of the vehicle if the number of eyes outside the range is one and the vehicle is in a state of transition from an auto drive mode to a manual drive mode.

5. The projection display device according to claim 3, wherein
the control unit performs the tracking control regardless of the running speed of the vehicle if the number of eyes outside the range is two.

6. The projection display device according to claim 5, wherein
in the tracking control that is performed if the number of eyes outside the range is two, the control unit decreases, as the running speed of the vehicle increases, at least one of a control speed of the projection angle or brightness of the image light in a period over which the projection angle is controlled.

7. The projection display device according to claim 6, wherein
the control unit sets, to a predetermined value, the control speed of the projection angle during the tracking control and the brightness of the image light in the period over which the projection angle is controlled, regardless of the running speed of the vehicle if the number of eyes outside the range is two and the vehicle is in a state of transition from an auto drive mode to a manual drive mode.

8. The projection display device according to claim 1, wherein
the control unit performs the tracking control regardless of the running speed of the vehicle if the number of eyes outside the range is two, and in the tracking control, the control unit decreases, as the running speed of the vehicle increases, at least one of a control speed of the projection angle or brightness of the image light in a period over which the projection angle is controlled.

9. The projection display device according to claim 1, wherein
the control unit does not perform the tracking control regardless of the number of eyes outside the range if the vehicle is in a reverse running state.

10. The projection display device according to claim 1, wherein
the projection display unit displays a virtual image that is based on the image data.

11. A projection control method for performing, in accordance with input image data, spatial modulation on light emitted by a light source, and projecting image light obtained through the spatial modulation onto a projection surface of a vehicle to display an image that is based on the image data, the projection control method comprising:
an eye position detection step of detecting, in accordance with captured image data obtained by capturing an image of a driver of the vehicle by an imaging unit, positions of two eyes of the driver in the captured image data; and
a control step of performing, in a state where at least one of the two eyes is outside a range of the captured image data in which the image that is based on the image data is visually recognizable by the driver, tracking control of controlling a projection angle of the image light on the projection surface to cause the positions of the two eyes to be within the range, wherein
in the control step, whether or not to perform the tracking control is determined in accordance with number of eyes outside the range and a running state of the vehicle.

12. The projection control method according to claim 11, wherein
the running state includes a running speed of the vehicle.

13. The projection control method according to claim 12, wherein
in the control step, the tracking control is performed when the running speed of the vehicle becomes lower than or equal to a threshold value if the number of eyes outside the range is one.

14. The projection control method according to claim 13, wherein
in the control step, the tracking control is performed regardless of the running speed of the vehicle if the number of eyes outside the range is one and the vehicle is in a state of transition from an auto drive mode to a manual drive mode.

15. The projection control method according to claim 13, wherein
in the control step, the tracking control is performed regardless of the running speed of the vehicle if the number of eyes outside the range is two.

16. The projection control method according to claim 15, wherein
in the tracking control that is performed if the number of eyes outside the range is two, in the control step, at least one of a control speed of the projection angle or brightness of the image light in a period over which the projection angle is controlled is decreased as the running speed of the vehicle increases.

17. The projection control method according to claim 16, wherein
in the control step, the control speed of the projection angle during the tracking control and the brightness of the image light in the period over which the projection angle is controlled are set to a predetermined value regardless of the running speed of the vehicle if the number of eyes outside the range is two and the vehicle is in a state of transition from an auto drive mode to a manual drive mode.

18. The projection control method according to claim 11, wherein
in the control step, the tracking control is performed regardless of the running speed of the vehicle if the number of eyes outside the range is two, and in the tracking control, at least one of a control speed of the projection angle or brightness of the image light in a period over which the projection angle is controlled is decreased as the running speed of the vehicle increases.

19. The projection control method according to claim 11, wherein
in the control step, the tracking control is not performed regardless of the number of eyes outside the range if the vehicle is in a reverse running state.

20. The projection control method according to claim 11, wherein
the image that is based on the image data is a virtual image.

21. A non-transitory computer readable medium storing a projection control program for performing, in accordance with input image data, spatial modulation on light emitted by a light source, and projecting image light obtained through the spatial modulation onto a projection surface of a vehicle to display an image that is based on the image data,
the projection control program causing a computer to execute:
an eye position detection step of detecting, in accordance with captured image data obtained by capturing an image of a driver of the vehicle by an imaging unit, positions of two eyes of the driver in the captured image data; and a control step of performing, in a state where at least one of the two eyes is outside a range of the captured image data in which the image that is based on the image data is visually recognizable by the driver, tracking control of controlling a projection angle of the image light on the projection surface to cause the positions of the two eyes to be within the range, wherein in the control step, whether or not to perform the tracking control is determined in accordance with number of eyes outside the range and a running state of the vehicle.

* * * * *